United States Patent
Knuckey et al.

(10) Patent No.: US 8,951,695 B2
(45) Date of Patent: *Feb. 10, 2015

(54) REDOX FUEL CELL WITH CATHOLYTE REDOX MEDIATOR

(75) Inventors: Kathryn Knuckey, Ormskirk (GB); David Rochester, Hetton-le-Hole (GB)

(73) Assignee: Acal Energy Limited, Runcorn, Cheshire (GB)

( * ) Notice: Subject to any disclaimer, the term of this patent is extended or adjusted under 35 U.S.C. 154(b) by 553 days.

This patent is subject to a terminal disclaimer.

(21) Appl. No.: 12/864,359

(22) PCT Filed: Jan. 23, 2009

(86) PCT No.: PCT/GB2009/050065
§ 371 (c)(1),
(2), (4) Date: Dec. 8, 2010

(87) PCT Pub. No.: WO2009/093080
PCT Pub. Date: Jul. 30, 2009

(65) Prior Publication Data
US 2011/0091746 A1    Apr. 21, 2011

(30) Foreign Application Priority Data
Jan. 23, 2008 (GB) .................................. 0801198.3

(51) Int. Cl.
H01M 8/20 (2006.01)
H01M 8/18 (2006.01)
H01M 8/10 (2006.01)

(52) U.S. Cl.
CPC ...... *H01M 8/188* (2013.01); *H01M 2008/1095* (2013.01); *Y02E 60/528* (2013.01)
USPC ........................................................ 429/498

(58) Field of Classification Search
USPC .................................................... 429/7, 101
See application file for complete search history.

(56) References Cited

U.S. PATENT DOCUMENTS 3,152,013 A    10/1964    Juda
3,279,949 A    10/1966    Schaefer et al.
(Continued)

FOREIGN PATENT DOCUMENTS

EP    0 043 647    1/1982
EP    0 228 168    11/1986
(Continued)

OTHER PUBLICATIONS

S.R. Alley and W. Henderson, "Synthesis and characterization of ferrocenyl-phosphonic and -arsonic acids," J. Organomet. Chem., 637-639, 2001, 216-229.
(Continued)

*Primary Examiner* — Patrick Ryan
*Assistant Examiner* — Lucas J O Donnell
(74) *Attorney, Agent, or Firm* — Knobbe Martens Olson & Bear LLP (57) ABSTRACT

This invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a redox mediator which is at least partially reduced at the cathode in operation of the cell, and at least partially regenerated by, optionally indirect, reaction with the oxidant after such reduction at the cathode, and a transition metal complex of a multidentate N-donor ligand as a redox catalyst catalyzing the regeneration of the mediator the multi-dentate N-donor ligand comprising at least one heterocyclic substituent selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid heterocyclic groups.

45 Claims, 2 Drawing Sheets

(56) References Cited

U.S. PATENT DOCUMENTS

| | | | |
|---|---|---|---|
| 3,294,588 A | 12/1966 | Beltzer et al. | |
| 3,360,401 A | 12/1967 | Grasselli et al. | |
| 3,540,933 A | 11/1970 | Boeke | |
| 3,607,420 A | 9/1971 | Cutler | |
| 4,048,383 A | 9/1977 | Clifford | |
| 4,396,687 A | 8/1983 | Kummer et al. | |
| 5,250,158 A | 10/1993 | Kaneko et al. | |
| 5,298,343 A | 3/1994 | Savadogo et al. | |
| 5,660,940 A | 8/1997 | Larsson et al. | |
| 5,683,829 A | 11/1997 | Sarangapani | |
| 5,958,616 A | 9/1999 | Salinas et al. | |
| 6,054,580 A | 4/2000 | Collins et al. | |
| 8,647,781 B2 * | 2/2014 | Knuckey et al. | 429/416 |
| 2001/0028977 A1 | 10/2001 | Kazacos et al. | |
| 2003/0152823 A1 | 8/2003 | Heller | |
| 2004/0028203 A1 | 2/2004 | Wurster et al. | |
| 2004/0028992 A1 | 2/2004 | Jaouen | |
| 2004/0137297 A1 | 7/2004 | Matsuoka et al. | |
| 2005/0074653 A1 | 4/2005 | Broman | |
| 2005/0112055 A1 | 5/2005 | Shannon et al. | |
| 2005/0158618 A1 | 7/2005 | Liberatore et al. | |
| 2005/0244707 A1 | 11/2005 | Skyllas-Kazacos et al. | |
| 2006/0012637 A1 | 1/2006 | Furukawa et al. | |
| 2006/0024539 A1 | 2/2006 | Dumesic | |
| 2006/0088750 A1 | 4/2006 | Nobuta | |
| 2006/0134493 A1 | 6/2006 | Yoshida et al. | |
| 2006/0216565 A1 | 9/2006 | Cooray et al. | |
| 2007/0078052 A1 | 4/2007 | Grinberg et al. | |
| 2007/0122689 A1 | 5/2007 | Kubo et al. | |
| 2007/0131546 A1 | 6/2007 | Nomoto et al. | |
| 2008/0274385 A1 | 11/2008 | Creeth | |
| 2009/0176162 A1 * | 7/2009 | Exnar et al. | 429/336 |
| 2009/0308752 A1 | 12/2009 | Evans et al. | |
| 2009/0317668 A1 | 12/2009 | Creeth et al. | |
| 2009/0325002 A1 | 12/2009 | Creeth et al. | |
| 2010/0112388 A1 | 5/2010 | Creeth et al. | |
| 2010/0112393 A1 | 5/2010 | Creeth et al. | |
| 2010/0297522 A1 | 11/2010 | Creeth et al. | |
| 2011/0014532 A1 | 1/2011 | Knuckey et al. | |
| 2011/0027671 A1 | 2/2011 | Knuckey et al. | |
| 2011/0039170 A1 | 2/2011 | Creeth et al. | |

FOREIGN PATENT DOCUMENTS

| | | |
|---|---|---|
| EP | 0 517 217 | 12/1992 |
| EP | 0 595 688 | 10/1993 |
| EP | 0 592 988 | 4/1994 |
| EP | 0 878 850 | 5/1998 |
| EP | 1 143 546 | 10/2001 |
| GB | 1 176 632 | 1/1970 |
| GB | 1 176 633 | 1/1970 |
| GB | 2 400 974 | 10/2004 |
| GB | 0505087.7 | 3/2005 |
| GB | 2 424 118 | 3/2006 |
| GB | 0605878.8 | 3/2006 |
| GB | 0608079.0 | 4/2006 |
| GB | 0614337.4 | 7/2006 |
| GB | 0614338.2 | 7/2006 |
| GB | 0718349.4 | 9/2007 |
| GB | 0718577.0 | 9/2007 |
| GB | 2 440 434 | 1/2008 |
| GB | 2 440 435 | 1/2008 |
| GB | 0801195.9 | 1/2008 |
| GB | 0801198.3 | 1/2008 |
| GB | 0801199.1 | 1/2008 |
| GB | 0907795.9 | 5/2009 |
| GB | 2 440 489 | 10/2009 |
| JP | 56 042970 | 4/1981 |
| JP | 61 054163 | 3/1986 |
| JP | 62 015770 | 1/1987 |
| JP | 05-295578 | 11/1993 |
| JP | 11-288727 | 10/1999 |
| JP | 2004 319292 | 11/2004 |
| RU | 2004129396 | 3/2006 |
| WO | WO 91/13681 | 9/1991 |
| WO | WO 96/31912 | 10/1996 |
| WO | WO 00/12667 | 3/2000 |
| WO | WO 00/22688 | 4/2000 |
| WO | WO 00/29537 | 5/2000 |
| WO | WO 03/083967 | 10/2003 |
| WO | WO 2005/112055 | 11/2005 |
| WO | WO 2006/012637 | 2/2006 |
| WO | WO 2006/057387 | 6/2006 |
| WO | WO 2006/097438 | 9/2006 |
| WO | WO 2006/121191 | 11/2006 |
| WO | WO 2007/101284 | 9/2007 |
| WO | WO 01/73881 | 10/2007 |
| WO | WO 2007/110663 | 10/2007 |
| WO | WO 2007116363 A2 * | 10/2007 |
| WO | WO 2007/122431 | 11/2007 |
| WO | WO 2007116363 A3 * | 12/2007 |
| WO | WO 2008/009992 | 1/2008 |
| WO | WO 2008/009993 | 1/2008 |
| WO | WO 2009/037513 | 3/2009 |
| WO | WO 2009/040577 | 4/2009 |
| WO | WO 2009/093080 | 7/2009 |
| WO | WO 2009/093081 | 7/2009 |
| WO | WO 2009/093082 | 7/2009 |
| WO | WO 2010/128333 | 11/2010 |

OTHER PUBLICATIONS

I. Bernal et al., "Iron(II) Complexes of Polydentate Aminopyridyl Ligands and an Exchangeable Sixth Ligand: Reactions with peroxides . . . " J. Chem. Soc., Dalton. Trans., 1995, 3667-3675.

J. Chang, et al., "Synthesis and Characterization of Bis(d-2-pyridylmethanamine)ruthenium(II)," Inorg. Chem. 2004, 43, 1735-1742.

R. Dillon, S. Sriinivasan, A.S. Arico, V. Antonucci, "International Activities in DMFC R&D: status of technologies and potential applications," J. Power Sources, 127, 2004, 112-126.

W. R. Harris et al., "Chelating Tendencies of Pyridyl-Containing Polyamines and Oxygenation of the Cobaltous Complexes." Inorg. Chem., 1978, 17, 889-894.

A. Heinzel, V.M. Barragan, "A review of the state-of-the-art of the methanol crossover in direct methanol fuel cells," J. Power Sources, 84, 1999, 70-74.

M.P. Hogarth, T.R. Ralph, "Catalysis for Low Temperature Fuel Cells," Platinum Metal Reviews, 46, 2002, 146-164.

M. Klopstra, R. Hage, R.M. Kellogg and B.L. Feringa, "Non-heme iron catalysts for the benzylic oxidation: a parallel ligand screening approach," Tel. Lett. 44, 2003, 4581-4584.

G.R. Knox and P.L. Pauson, "Ferrocene Derivatives, Part VII. Some Sulphur derivatives," J. Chem. Soc., 1958, 682.

Limoges, B.R. et al. "Electrocatalyst materials for fuel cells based on the polyoxometalates [PMo(12-n)Vn040]<(3+n)->(n=0-3)", Electrochimica Acta, Elsevier Scient Publishers, Barking, GB, vol. 50, No. 5, Jan. 15, 2005pp. 1169, 1170, 1176-1179.

M. Lubben et al., "Nonheme Iron Centers in Oxygen Activation: Characterization of an Iron(III) Hydroperoxide Intermediate," Angew. Chem. Int. Ed. Engl., 34, 1995, 1512-1514.

D. L. Reger et al. , "Synthesis and structural characterization of the bitopic ferrocene-based tris(pyrazolyl)methane ligand Fe[C5H4CH2OCH2C(pz)3]2 (pz=pyrazolyl ring)" J. Chem. Crystallography, 35, 2005, 217-225.

H. Sato et al., "Convenient Synthesis of N,N,N',N'—Tetrakis(2-pyridylmethyl)-α,ω-alkanediamines Using a Phase-Transfer Catalyst," Synthesis, 1992, 539-540.

M. Tamura et al., "Superoxide Dismutase Activity of Iron(II) TPEN complex and Its Derivatives," Chem. Pharm. Bull., 48, 2000, 1514-1518.

(56) References Cited

OTHER PUBLICATIONS

M Van den Heuval et al., "Synthesis of a Non-Heme Template for Attaching Four Peptides: An Approach to Artificial Iron(II)-Containing Peroxidases," J. Organ. Chem., 69, 2004, 250-262.

V. Neburchilov, J. Martin, H. Wang, J. Zhang, "A Review of Polymer Electrolyte Membranes for Direct Methanol Fuel Cells," Journal of Power Sources, 2007, vol. 169, pp. 221-238.

J.G. Roelfes, "Models for Non-Heme Iron Containing Oxidation Enzymes," Jun. 4, 1972, pp. 1-154.

* cited by examiner

Fig. 1

Fig. 2

REDOX FUEL CELL WITH CATHOLYTE REDOX MEDIATOR

CROSS-REFERENCE TO RELATED APPLICATIONS

This Application is the US National Phase under 35 U.S.C. §371 of International Application No. PCT/GB2009/050065, filed Jan. 23, 2009, which was published in English as International Publication No. WO 2009/093080 on Jul. 30, 2009, and claims the benefit of GB 0801198.3, filed Jan. 23, 2008.

BACKGROUND

1. Field

The present invention relates to fuel cells, in particular to indirect or redox fuel cells which have applications as power sources for: portable products such as portable electronics products; for transport vehicles such as automobiles, both main and auxiliary; auxiliary power for caravans and other recreational vehicles, boats etc; stationary uses such as uninterruptible power for hospitals computers etc and combined heat and power for homes and businesses. The invention also relates to the use of certain catalysts for use in such fuel cells.

2. Description of the Related Art

Fuel cells have been known for portable applications such as automotive and portable electronics technology for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, and air or oxygen as oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it, and this oxidised species is fed to the cathode (anode for fuel). There are several types of fuel cell characterised by their different electrolytes. The liquid electrolyte alkali electrolyte fuel cells have inherent disadvantages in that the electrolyte dissolves $CO_2$ and needs to be replaced periodically. Polymer electrolyte or PEM-type cells with proton-conducting solid cell membranes are acidic and avoid this problem. However, it has proved difficult in practice to attain power outputs from such systems approaching the theoretical maximum level, due to the relatively poor electrocatalysis of the oxygen reduction reaction. In addition expensive noble metal electrocatalysts are often used.

Many current fuel cell technologies employ cathodes where oxygen gas is flowed directly to the electrode where it then reacts with a catalyst to produce water. In many cases the catalyst employed is platinum, a precious metal. Not only does this increase the costs of the overall fuel cell, but the inefficiency of the reaction leads to a loss in available power.

U.S. Pat. No. 3,152,013 discloses a gaseous fuel cell comprising a cation-selective permeable membrane, a gas permeable catalytic electrode and a second electrode, with the membrane being positioned between the electrodes and in electrical contact only with the gas permeable electrode. An aqueous catholyte is provided in contact with the second electrode and the membrane, the catholyte including an oxidant couple therein. Means are provided for supplying a fuel gas to the permeable electrode, and for supplying a gaseous oxidant to the catholyte for oxidising reduced oxidant material. The preferred catholyte and redox couple is HBr/KBr/ $Br_2$. Nitrogen oxide is disclosed as a preferred catalyst for oxygen reduction, but with the consequence that pure oxygen was required as oxidant, the use of air as oxidant requiring the venting of noxious nitrogen oxide species.

An acknowledged problem concerning electrochemical fuel cells is that the theoretical potential of a given electrode reaction under defined conditions can be calculated but never completely attained. Imperfections in the system inevitably result in a loss of potential to some level below the theoretical potential attainable from any given reaction. Previous attempts to reduce such imperfections include the selection of catholyte additives which undergo oxidation-reduction reactions in the catholyte solution. For example, U.S. Pat. No. 3,294,588 discloses the use of quinones and dyes in this capacity. Another redox couple which has been tried is the vanadate/vanadyl couple, as disclosed in U.S. Pat. No. 3,279, 949.

According to U.S. Pat. No. 3,540,933, certain advantages could be realised in electrochemical fuel cells by using the same electrolyte solution for both catholyte and anolyte. This document discloses the use of a liquid electrolyte containing more than two redox couples therein, with equilibrium potentials not more than 0.8 V apart from any other redox couple in the electrolyte.

The matching of the redox potentials of different redox couples in the electrolyte solution is also considered in U.S. Pat. No. 3,360,401, which concerns the use of an intermediate electron transfer species to increase the rate of flow of electrical energy from a fuel cell. The use of platinum coated electrodes is also disclosed.

Several types of proton exchange membrane fuel cells exist. For example, in U.S. Pat. No. 4,396,687 a fuel cell is disclosed which comprises regenerable anolyte and catholyte solutions. The anolyte solution is one which is reduced from an oxidised state to a reduced state by exposure of the anolyte solution to hydrogen. According to U.S. Pat. No. 4,396,687, preferred anolyte solutions are tungstosilicic acid ($H_4SiW_{12}O_{40}$) or tungstophosphoric acid ($H_3PW_{12}O_{40}$) in the presence of a catalyst.

The preferred catholyte solution of U.S. Pat. No. 4,396,687 is one which is re-oxidised from a reduced state to an oxidized state by direct exposure of the catholyte solution to oxygen. The catholyte of U.S. Pat. No. 4,396,687 includes a mediator component comprising a solution of $VOSO_4$. The mediator functions as an electron sink which is reduced from an oxidation state of $V^{(v)}$ to $V^{(IV)}$. The catholyte also includes a catalyst for regenerating the mediator to its oxidised state, $(VO_2)_2SO_4$. The catalyst present in the catholyte of U.S. Pat. No. 4,396,687 is a polyoxometallate (POM) solution, namely $H_5PMo_{10}V_2O_{40}$.

A significant amount of investigation into the interaction of certain N-donor complexes with oxidants such as hydrogen peroxide or peracids has been reported in the general literature and elsewhere.

WO-A-0012667 describes the use of N-donor complexes as transition metal bleach catalysts which can catalyse the oxidation of stains by air or dioxygen in aqueous solution.

WO0029537 describes the use of transition metal complexes containing cross-bridged macropolycyclic N-donor ligands as bleach catalysts which operate in detergent compositions which are substantially free of any organic or inorganic peroxygen compounds.

A thesis entitled 'Models for non-heme iron containing oxidation enzymes' by J. G. Roelfes (http://dissertations.ub-.rug.nl/faculties/science/2000/j.g.roelfes/) mentions that Fe(N4Py) type complexes are capable of oxygen activation as demonstrated in DNA cleavage experiments.

M. Klopstra, R. Hage, R. M. Kellogg and B. L Feringa, *Tet. Lett.*, 2003, 44, 4581: discusses benzylic oxidation by catalysts such as Fe(N4Py) using $O_2$ as the oxidant. An autoxidation mechanism is proposed where Fe catalyst reacts with 1-phentlethylhydroperoxide.

U.S. Pat. No. 5,298,343 relates to polycomponent electrocatalysts suitable for use at the cathode of electrochemical and fuel cells.

US-A-2005/0112055 discloses a catalyst comprising a diruthenium-substituted polyoxometallate.

Prior art fuel cells all suffer from one or more of the following disadvantages:

They are inefficient; they are expensive and/or expensive to assemble; they use expensive and/or environmentally unfriendly materials; they yield inadequate and/or insufficiently maintainable current densities and/or cell potentials; they are too large in their construction; they operate at too high a temperature; they produce unwanted by-products and/or pollutants and/or noxious materials; they have not found practical, commercial utility in portable applications such as automotive and portable electronics.

SUMMARY

It is an object of the present invention to overcome or ameliorate one or more of the aforesaid disadvantages. It is a further object of the present invention to provide an improved catholyte solution for use in redox fuel cells.

A series of catalysts and/or mediators which are suitable for use in fuel cells and are based on transition metal complexes of N-donor ligands is described in PCT/GB2007/050421. It would however be desirable to provide N-donor ligand-based catalysts which are more robust at lower pH values to enable more acidic catholyte solutions to be used in a fuel cell containing a cation selective polymer electrolyte membrane. Additionally, it would be desirable to create N-donor ligand-based catalysts which operate at higher potential and/or exhibit faster rates of oxygen reduction.

To solve one or more of the problems outlined above, one or more of the pyridylmethyl groups described in previous N-donor systems, can be exchanged for a pendent arm containing a different N-containing heterocycle.

Accordingly, the present invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a catholyte solution comprising at least one non-volatile catholyte component flowing in fluid communication with the cathode, the catholyte solution comprising a redox mediator which is at least partially reduced at the cathode in operation of the cell, and at least partially regenerated by, optionally indirect, reaction with the oxidant after such reduction at the cathode, the catholyte solution comprising a complexed multidentate N-donor ligand as said redox mediator and/or as a redox catalyst catalysing the regeneration of the said mediator, the multi-dentate N-donor ligand comprising at least one substituent selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups.

When the multidentate N-donor ligand is a non-polymeric small molecule, it may contain up to 8 nitrogen atoms capable of coordinating to a transition metal centre and may coordinate through each or any of these nitrogen atoms. Preferably, the multidentate N-donor ligand should contain between three and six nitrogen atoms capable of coordinating to a transition metal centre and may complex to transition metals via any or each of those three to six nitrogen atoms. More preferably the N-donor ligand should contain four, five or six nitrogen atoms capable of coordinating to a transition metal centre. In especially preferred embodiments, the N-donor ligand contains five or six nitrogen atoms capable of coordinating to a transition metal centre.

Of these N-donor atoms, at least one, but up to six, or more, is contained within an optionally substituted heterocycle. The heterocycle is selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups. The heterocycle may contain any number of substituent functional groups at any position/s on the ring. Such substituent groups include alkyl, aryl, alkenyl, alkynyl, amine, protonated amine, quaternary amine, sulfate, sulfonate, sulfonic acid, phosphate, phosphonate, phosphonic acid, carboxylate, carboxylic acid and/or halides as a selection of non-limiting examples. The or each functional group may be spaced from the heterocycle by any number of suitable spacer elements, for example, alkyl, alkenyl, aryl, cycloalkyl, alkaryl, aralkyl or aralkenyl spacer elements, in which where appropriate any hydrocarbon chain may be straight or branched.

The N-donor ligand may contain one or more further heterocyclic substituents, including for example pyridine substituents, or alkyl, alkenyl, aryl, cycloalkyl, alkaryl, alkenaryl, aralkyl, aralkenyl groups substituted with pyridine.

Furthermore, there may be any number of additional N-containing groups contained within the overall ligand which are not involved in binding to the central transition metal.

An example of a suitable structure is given below:

X, Y and Z can be any optionally substituted N-containing heterocycle, at least one of which is selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups. The heterocycle may contain any number of substituent functional groups at any position/s on the ring. Such substituent groups include alkyl, aryl, alkenyl, alkynyl, amine, protonated amine, quaternary amine, sulfate, sulfonate, sulfonate, sulfonic acid, sulfonic acid, phosphate, phosphonate, phosphonic acid, carboxylate, carboxylic acid and/or halides as a selection of non-limiting examples. The or each functional group may be spaced from the heterocycle by any number of suitable spacer elements (A, B and C) for example, alkyl, alkenyl, aryl, cycloalkyl, alkaryl, aralkyl or aralkenyl spacer elements, in which where appropriate any hydrocarbon chain may be straight or branched.

X, Y and Z may be the same or different.

A, B and C may be the same or different.

a, b and c can be any integer between 1 and 5, more preferably 1-3.

The structure, and the other structures identified herein, may also comprise one or more pyridine substituents, or alkyl, alkenyl, aryl, cycloalkyl, alkaryl, alkenaryl, aralkyl, aralkenyl groups substituted with pyridine Non-limiting examples include:

Another example structure is given below:

Wherein $R^1$ to $R^5$ are independently any group or atom, with from two to five, more preferably, three to five, and most preferably four of $R^1$ to $R^5$ comprising organic groups containing an N donor atom, with from one to five, more preferably three to five and most preferably four, of those N donor atoms belonging to one or more optionally substituted heterocycles. At least one heterocycle is selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups. The heterocycle may contain any number of substituent functional groups at any position/s on the ring. Such substituent groups include alkyl, aryl, alkenyl, alkynyl, amine, protonated amine, quaternary amine, sulfate, sulfonate, sulfonate, sulfonic acid, sulfonic acid, phosphate, phosphonate, phosphonic acid, carboxylate, carboxylic acid and/or halides as a selection of non-limiting examples. The or each functional group may be spaced from the heterocycle by any number of suitable spacer elements, for example, alkyl, alkenyl, aryl, cycloalkyl, alkaryl, aralkyl or aralkenyl spacer elements, in which where appropriate any hydrocarbon chain may be straight or branched. The remaining atoms in groups $R^1$ to $R^5$ can include carbon, hydrogen, oxygen, sulphur, phosphorous and/or halides, some of which may additionally coordinate to the metal centre.

$R^1$-$R^5$ may be the same or different.

Non-limiting examples include:

A further example of a suitable structure is given below:

Preferably, n is any integer from 1 to 10, more preferably n is from 1 to 5, most preferably n is 1 to 3, with n=2 being particularly preferred. One to four and more preferably two to four of $R^1$ to $R^4$ are organic groups containing an N donor atom, with at least one, but up to four and more preferably three or four of those N-donor atoms should belong to an optionally substituted heterocycle. At least one heterocycle is selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups. The heterocycle may contain any number of substituent functional groups at any position/s on the ring. Such substituent groups include alkyl, aryl, alkenyl, alkynyl, amine, protonated amine, quaternary amine, sulfate, sulfonate, sulfonate, sulfonic acid, sulfonic acid, phosphate, phosphonate, phosphonic acid, carboxylate, carboxylic acid and/or halides as a selection of non-limiting examples. The or each functional group may be spaced from the heterocycle by any number of suitable spacer elements, for example, alkyl, alkenyl, aryl, cycloalkyl, alkaryl, aralkyl or aralkenyl spacer elements, in which where appropriate any hydrocarbon chain may be straight or branched. The remaining atoms in groups $R^1$ to $R^4$ can include carbon, hydrogen, oxygen, sulphur, phosphorous and/or halides, some of which may additionally coordinate to the metal centre. $R^1$ to $R^4$ may be the same or different.

Non-limiting examples include:

-continued

The catholyte may comprise the complexed multidentate N-donor ligand (the "ligand complex") as said redox mediator, and as said redox catalyst. Alternatively, the catholyte solution may comprise one or more alternative redox mediators, and the ligand complex as redox catalyst for the said mediator(s). Alternatively, the catholyte solution may comprise the ligand complex as redox mediator and one or more alternative redox catalysts for the ligand complex mediator. In other words the ligand complex can function alternatively as redox mediator an/or as redox catalyst in the catholyte solution, with or without one or more secondary redox mediator(s) and/or redox catalyst(s).

Thus, in a first system in accordance with the invention, the ligand complex functions as a redox catalyst (referred to below as "Cat") and is at least partially oxidised in the cathode region of the cell in operation thereof, and then reduced back to its original state at the electrode in regenerative redox cycle with the redox mediator (referred to below as "Med") in accordance with Scheme I:

In a second system in accordance with the invention, an alternative redox catalyst (referred to below as "Cat") and is at least partially oxidised in the cathode region of the cell in operation thereof, and then reduced back to its original state at the electrode in regenerative redox cycle with the ligand complex redox mediator (referred to below as "Med") in accordance with Scheme II:

In a third system in accordance with the invention, the ligand complex functions as both redox catalyst (referred to below as "Cat") and as redox mediator (referred to below as "Med") in accordance with Scheme III:

Accordingly, in operation of the fuel cell of the invention the oxidant (i.e. oxygen or any other suitable oxidant) is reduced in the catholyte solution by the redox catalyst. Preferably, the resulting oxidised redox catalyst is effective at least partially to oxidise the mediator to regenerate the mediator after its reduction at the cathode.

Thus, one fuel cell in accordance with the invention is a PEM fuel cell that uses an aqueous cathode system with a catholyte consisting of two soluble active species, a mediator and a catalyst. Oxygen is reduced in solution by the catalyst, which in turn oxidises the mediator, which is then reduced back to its original state at the electrode. Completion of this cycle creates a regenerative redox cathode.

For fuel cell operation, oxygen reduction must be efficiently catalysed. Conventional technologies tend to employ heterogeneous catalysts for oxygen reduction, where a catalyst such as platinum is deposited at the electrode and termed an electrocatalyst. The present system instead (or as well) uses homogeneous catalysis, e.g. a water-soluble catalyst for oxygen reduction.

Homogeneous catalyst systems have been described before in connection with fuel cells. One such is described in our own co-pending United Kingdom patent application no. 0605878.8, in which a polyoxometallate (POM) system is used as a catalyst. However, in certain types of fuel cell it may be desirable not to have such a high concentration of metal centres in the catalyst as are present in the polyoxometallate system.

It would therefore be advantageous to provide a catalytic system which is soluble in the catholyte solution (e.g. in aqueous solution when the catholyte solution is aqueous) but offers a similar catalytic rate of oxygen reduction at lower concentrations of catalyst, and/or operates at a higher potential. Additionally, a catalyst which can interact with a range of different mediators and/or additional catalysts, and a mediator which can interact with a range of different catalysts and/or additional mediators without precipitation could allow access to a versatile system capable of achieving increased current densities.

Also provided in accordance with the invention is a catholyte solution for use in such a redox fuel cell, the catholyte solution comprising at least one transition metal complex of a multidentate N-donor ligand as redox mediator and/or as redox catalyst.

Thus, we have found that complexed multidentate N-donor ligands in particular can be effective redox catalysts and/or redox mediators in fuel cell operation. Surprisingly, rates of catalysis on a molar basis similar to the POM system described in our co-pending United Kingdom patent application no. 0605878.8 are achievable by employing a lower relative concentration of metal centres.

The fuel cell of the invention preferably comprises at least one such complexed ligand in the catholyte solution. The N-donor ligands may generally be coordinated with any suitable metal or metals, for example suitable transition metals. Specific examples of suitable transition metal ions which can form complexes include manganese (II-V), iron (I-IV), copper (I-III), cobalt (I-III), nickel (I-III), chromium (II-VII), titanium (II-IV), tungsten (IV-VI), vanadium (II-V), and molybdenum (II-VI). More preferably the transition metal should be manganese (II-V), iron (I-IV), copper (I-III) or cobalt (I-III). The ligands themselves may contain carbon, hydrogen, oxygen, nitrogen, sulphur, halides and/or phosphorous, for example.

It may be desirable, for example if the complete N-donor metal complex is to be used as a catalyst and/or mediator in a PEM cell comprising a cation exchange membrane, that the complex be non-ionic in its oxidized form or, preferably, anionic. In this or in any other desired case, anionic charge can be introduced by modifying the N-donor ligand with one or more anionic charge inducing groups such as carboxylate, carboxylic acid, phosphate, phosphonate or phosphonic acid groups. Stronger acid groups such as sulphonate, sulphate or sulphonic acid could also be introduced.

Alternatively, when the complete N-donor metal complex is to be used as a catalyst and/or mediator in a PEM cell comprising a anion exchange membrane, it will preferably be non-ionic in its reduced form, or more preferably, cationic. Cationic charge can be introduced to the N-donor ligand by modifying it with cationic charge inducing groups such as protonated amines or quaternary amine groups.

The complete redox catalyst complex should be between four and eight coordinate, but more preferably six coordinate overall. Where the number of coordinating nitrogen atoms contained within the N-donor ligand is less than six, additional coordinating species are required. These species may be mono-, bi- and/or tridentate and may be either neutral or negatively charged. One skilled in the art will appreciate the vast array of suitable coordinating species which includes $H_2O$, $OH^-$, $Cl^-$, $CH_3OH$ and $CH_3CN$ as non-limiting examples.

In order to balance the charge of the transition metal catalyst, non-coordinating counter cations or anions are also present. Again, one skilled in the art will appreciate the vast array of suitable counter ions which includes $ClO_4^-$, $PF_6^-$, $Cl^-$, $CN^-$, $SO_4^{2-}$, $Na^+$ and $K^+$ as non-limiting examples.

Redox mediators and/or catalysts for use in conjunction with the N-donor ligand complex can be selected from a very large range of suitable materials, including ligated transition metal complexes and polyoxometallate species. Specific examples of suitable transition metals ions which can form such complexes include manganese (II-V), iron (I-IV), copper (I-III), cobalt (I-III), nickel (I-III), chromium (II-VII), titanium (II-IV), tungsten (IV-VI), vanadium (II-V) and molybdenum (II-VI). Ligands in such ligated transition metal complexes may be chelating such as 2,2'-bipyridine and/or 1,10-phenanthroline, or non-chelating such as chloride and/or cyanide. Complexes of such ligands (e.g. transition metal complexes) may contain solely chelating or non-chelating ligands, or a mixture of the two.

One preferred redox mediator comprises a modified ferrocene species and is disclosed in PCT/GB2007/050420, and in our co-pending applications GB (P509431 GB) and GB (P509432 GB) filed 23 Jan. 2008.

If a modified ferrocene species is to be used as a redox mediator in a PEM cell comprising a cation exchange membrane, it will be preferably be non-ionic in its oxidized form or, more preferably, anionic. Anionic charge can be introduced to ferrocene by modifying it with anionic charge inducing groups such as carboxylate, carboxylic acid, phosphate, phosphonate or phosphonic acid groups. Stronger acid groups such as sulphonate, sulphate or sulphonic acid could also be introduced.

Alternatively, when the modified ferrocene species is to be used as a redox mediator in a PEM cell comprising a anion exchange membrane, it will preferably be non-ionic in its reduced form, or more preferably, cationic. Cationic charge can be introduced to ferrocene by modifying it with cationic charge inducing groups such as protonated amines or quaternary amine groups.

Thus, it can be seen that the charge of the modified ferrocene species can be easily modified. This allows it to be tailored to the particular conditions of the cell with which it is to be used. For example, it can be tailored to the potential of the catholyte redox catalyst and the pH of the catholyte.

When the redox mediator is a modified ferrocene species, it may be represented by the formula:

wherein:

X and Y are independently selected from hydrogen and functional groups comprising halogen, hydroxy, amino, protonated amino, imino, nitro, cyano, acyl, acyloxy, sulphate, sulphonyl, sulphinyl, alkylamino, protonated alkylamino, quaternary alkylammonium, carboxy, carboxylic acid, ester, ether, amido, sulphonate, sulphonic acid, sulfonamide, phosphonyl, phosphonic acid, alkylsulphonyl, arylsulphonyl, alkoxycarbonyl, alkylsulphinyl, arylsulphinyl, alkylthio, arylthio, alkyl, alkoxy, oxyester, oxyamido, aryl, arylamino, aryloxy, heterocycloalkyl, heteroaryl, $(C_2$-$C_5)$alkenyl, $(C_2$-$C_5)$alkynyl, azido phenylsulphonyloxy or amino acid conjugates having the formula —CO—W—OH, where W is an amino acid.

Preferably, at least one of X and Y are independently selected from hydrogen and functional groups comprising, halogen, hydroxy, amino, protonated amino, imino, acyl, sulphate, alkylamino, protonated alkylamino, quaternary alkylammonium, carboxy, carboxylic acid, ester, oxyester, alkoxy, sulphonyl, sulphinyl, alkylsulphonyl, sulphonic acid, sulphonamide, phosphonic acid, phosphonate, phosphate, amido, oxyamido or amino acid conjugates having the formula —CO—W—OH, where W is an amino acid and from alkyl, alkenyl, aryl, cycloalkyl, alkaryl alkenaryl, aralkyl, aralkenyl groups substituted with one or more of the aforesaid functional groups.

More preferably, at least one of X and Y are independently selected from hydrogen and functional groups comprising F, CHO, —COCH$_3$, —COCH$_2$CH$_3$, —COCH$_2$CH$_2$COOH, —COOH, —(COOH)$_2$, —NH$_2$, NH$_3^+$, —N(CH$_3$)$_2$, —NH(CH$_3$)$_2^+$, —N(CH$_3$)$_3^+$, —H(CH$_2$CH$_3$)$_2$, —NH(CH$_2$CH$_3$)$^+$, —N(CH$_2$CH$_3$)$_3^+$, —CH$_2$N(CH$_3$)$_2$, CH$^2$NH(CH$_3$)$_2^+$, —CH$_2$N(CH$_3$)$_3^+$, —OH, —CH$_2$OH, —CH(OH)CH$_3$, —OSO$_3^-$, —SO$_3^-$, —CH$_2$SO$_3^-$, —CH$_2$OSO$_3^-$, PO(OH)$_2$, —OPO(OH)$_2$, —CO-Gly-OH, —CO-Glu-OH or —CO-Asp-OH, and from alkyl, alkenyl, aryl, cycloalkyl, alkaryl alkenaryl, aralkyl, aralkenyl groups substituted with one or more of the aforesaid functional groups.

There may be any number from 1 to 5× substituents, in which case each X substituent may be the same or different. There may be any number from 1 to 5 Y substituents, in which case each Y substituent may be the same or different. All five X groups and all five Y groups cannot concomitantly be hydrogen.

X and Y may be separated from the ring by one or more spacer elements. X and Y may together form a divalent linking group between the cyclopentadienyl rings.

The concentration of the redox mediator in the catholyte solution is preferably at least about 0.0001M, more preferably at least about 0.005M, and most preferably at least about 0.001M.

The concentration of the redox catalyst in the catholyte solution is preferably at least about 0.0001M, more preferably at least about 0.005M, and most preferably at least about 0.001M.

In one preferred embodiment of the invention, the ion selective PEM is a cation selective membrane which is selective in favour of protons versus other cations. In this case the pH of the catholyte is preferably acidic. It preferably has a pH of below 7, more preferably below 4, even more preferably below 2 and most preferably below 1.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulphonic acid resins, and the like. Perfluorocarboxylic acid resins are preferred, for example "Nafion" (Du Pont Inc.), "Flemion" (Asahi Gas Ltd), "Aciplex" (Asahi Kasei Inc), and the like. Non-fluororesin-type ion exchange resins include polyvinyl alcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytrifluorostyrene sulphonic, sulphonated trifluorostyrene, sulphonated copolymers based on $\alpha,\beta,\beta$ trifluorostyrene monomer, radiation-grafted membranes. Non-fluorinated membranes include sulphonated poly(phenylquinoxalines), poly(2,6 diphenyl-4-phenylene oxide), poly(arylether sulphone), poly(2,6-diphenylenol); acid-doped polybenzimidazole, sulphonated polyimides; styrene/ethylene-butadiene/styrene triblock copolymers; partially sulphonated polyarylene ether sulphone; partially sulphonated polyether ether ketone (PEEK); and polybenzyl suphonic acid siloxane (PBSS).

In another preferred embodiment of the invention, the ion selective PEM is an anionic selective membrane. Suitable examples of anionic membranes include quaternary amine derivatives of styrene cross-linked with divinyl benzene and polymerised in the presence of finely powdered polyvinyl chloride to provide strength.

In embodiments where the PEM is anion selective, the catholyte is preferably alkaline. It preferably has a pH above 7, more preferably above 8.

In some cases it may be desirable for the ion selective polymer electrolyte membrane to comprise a bi-membrane. The bimembrane if present will generally comprise a first cation selective membrane and a second anion selective membrane. In this case the bimembrane may comprise an adjacent pairing of oppositely charge selective membranes. For example the bi-membrane may comprise at least two discreet membranes which may be placed side-by-side with an optional gap there between. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer vehicle. A single cation-selective membrane may not achieve this to the same extent due to the free movement of other cations from the catholyte solution in the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials other than protons from passing therethrough from the cathode side to the anode side thereof. In this case protons may pass from anode to cathode.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprise one or more perforations in the cation selective membrane, allowing such flushing directly through the membrane. Alternatively means may be provided for channeling flushed materials around the cation selective membrane from the interstitial space to the cathode side of the said membrane.

A representative example of a useful bipolar membrane, the arrangement used with the anionic-selective membrane on the anode side is that sold under the trademark Neosepta® BP-1, available from Tokuyama Corporation.

According to another aspect of the present invention, there is provided a method of operating a proton exchange membrane fuel cell comprising the steps of:

a) forming $H^+$ ions at an anode situated adjacent to a proton exchange membrane;

b) supplying the catholyte of the invention with its redox mediator in an oxidised state and its redox catalyst in a reduced state to a cathode situated oppositely adjacent to the proton exchange membrane; and c) allowing the mediator to become reduced upon contact with the cathode concomitantly with $H^+$ ions passing through the membrane to balance charge.

In another embodiment, the catholyte is supplied from a catholyte reservoir.

The method of the above fourth aspect may additionally comprise the step of:

d) passing the catholyte from the cathode to a reoxidation zone wherein the mediator is reoxidised by the catalyst reacting with the oxidant.

In another embodiment, the method of the above aspect comprises the step of:

e) passing the catholyte from the reoxidation zone to the catholyte reservoir.

In this embodiment, the cell is cyclic and the mediator and catalyst in the catholyte can be repeatedly oxidised and reduced without having to be replaced.

An electricity loading device configured to load an electric power may also be provided in association with the fuel cell of the invention.

The fuel cell of the invention may comprise a reformer configured to convert available fuel precursor such as LPG, LNG, gasoline or low molecular weight alcohols into a fuel gas (e.g. hydrogen) through a steam reforming reaction. The cell may then comprise a fuel gas supply device configured to supply the reformed fuel gas to the anode chamber.

Preferred fuels include hydrogen; metal hydrides, for example borohydride which may act as fuel itself or as a provider of hydrogen, low molecular weight alcohols, aldehydes and carboxylic acids, sugars and biofuels as well as LPG, LNG or gasoline.

Preferred oxidants include air, oxygen and peroxides.

The anode in the redox fuel cell of the invention may for example be a hydrogen gas anode or a direct methanol anode; other low molecular weight alcohols such as ethanol, propanol, dipropylene glycol; ethylene glycol; also aldehydes formed from these and acid species such as formic acid, ethanoic acid etc. In addition the anode may be formed from a bio-fuel cell type system where a bacterial species consumes a fuel and either produces a mediator which is oxidized at the electrode, or the bacteria themselves are adsorbed at the electrode and directly donate electrons to the anode.

The cathode in the redox fuel cell of the invention may comprise as cathodic material carbon, gold, platinum, nickel, metal oxide species. However, it is preferable that expensive cathodic materials are avoided, and therefore preferred cathodic materials include carbon, nickel, titanium and other metals inert in the specific catholyte and metal oxide or sulphide. One preferable material for the cathodes is reticulated vitreous carbon or carbon fibre based electrodes such as carbon felt. Another is nickel foam or mesh, or titanium foam or mesh. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox mediator flowing in solution in the cathode chamber in operation of the cell is used in the invention with a catalyst for the reduction of oxygen in the cathode chamber, in accordance with the following (wherein Sp is the redox couple species).

$$O_2 + 4Sp_{red} + 4H^+ \rightarrow 2H_2O + 4Sp_{ox}$$

The redox couple, and any other ancillary redox couple, utilised in the fuel cell of the invention should be non-volatile, and is preferably soluble in aqueous solvent. Preferred redox couples should react with the oxidant at a rate effective to generate a useful current in the electrical circuit of the fuel cell, and react with the oxidant such that water is the ultimate end product of the reaction.

The fuel cell of the invention requires the presence of at least one redox mediator species and also a redox catalyst comprising a transition metal complex of a multidentate N-donor ligand. However, in some circumstances it may also be possible to include other redox couples in the catholyte solution as ancillary redox couples.

BRIEF DESCRIPTION OF THE DRAWINGS

Various aspects of the present invention will now be more particularly described with reference to the following Figure.

DETAILED DESCRIPTION

Figure 1:
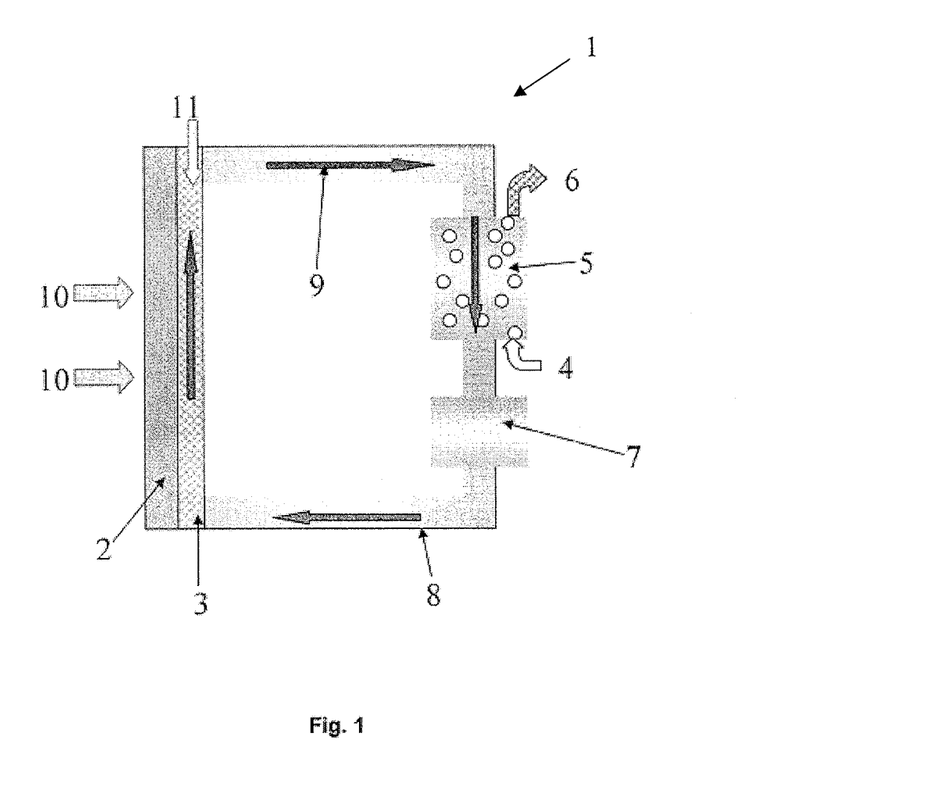
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. However, other cathodic materials such as platinum may be used. Polymer electrolyte membrane 2 comprises cation selective Nafion 112 membrane through which protons generated by the (optionally catalytic) oxidation of fuel gas (in this case hydrogen) in the anode chamber pass in operation of the cell. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the mediator reoxidation zone) is provided with exhaust 6, through which the by-products of the fuel cell reaction (e.g. water and heat) can be discharged.

A catholyte solution comprising the oxidised form of the redox mediator is supplied in operation of the cell from catholyte reservoir 7 into the cathode inlet channel 8. The catholyte passes into reticulated carbon cathode 3, which is situated adjacent membrane 2. As the catholyte passes through cathode 3, the redox mediator is reduced, and is then returned to cathode gas reaction chamber 5 via cathode outlet channel 9.

Due to the advantageous composition of the catholyte of the present invention, reoxidation of the mediator occurs, catalysed by a transition metal complex of a multidentate N-donor ligand, which allows greater flexibility in designing catholyte systems for the fuel cell to produce for higher potential and/or a higher sustainable current than with catholytes of the prior art.

The following non-limiting examples describe the synthesis of a selection of N-donor ligands of the present invention.

Example 1

Synthesis of Bis((2-pyridyl)methyl)((1-methylimidazol-2-yl)methyl)amine

[BPIA]

Synthesis was conducted as described in *Inorg. Chem.*, 1994, 33, 1177.

Example 2

Synthesis of Bis(1-methylimidazol-2-yl)methyl)((2-pyridyl)methyl)amine)

[BIPA]

Synthesis was conducted as described in *Inorg. Chem.*, 1994, 33, 1177.

The performance of the catholyte of the present invention is described in the following examples.

Example 3

The oxidation of mediator (dimethylaminomethyl)ferrocene ($Fc-CH_2NMe_2$) by oxygen was studied at 75° C. in 0.1 M glycine buffer solution at pH 2.5, using an iron (II) complex of bis((2-pyridyl)methyl)((1-methylimidazol-2-yl)-methyl)amine [BPIA] as an oxidation catalyst. The oxidation of $Fc-CH_2NMe_2$ to $[Fc-CH_2NMe_2]^+$ can be monitored using UV-Vis absorption spectroscopy as the oxidised product exhibits a peak at 626 nm which is not present in any of the starting materials.

Figure 2:
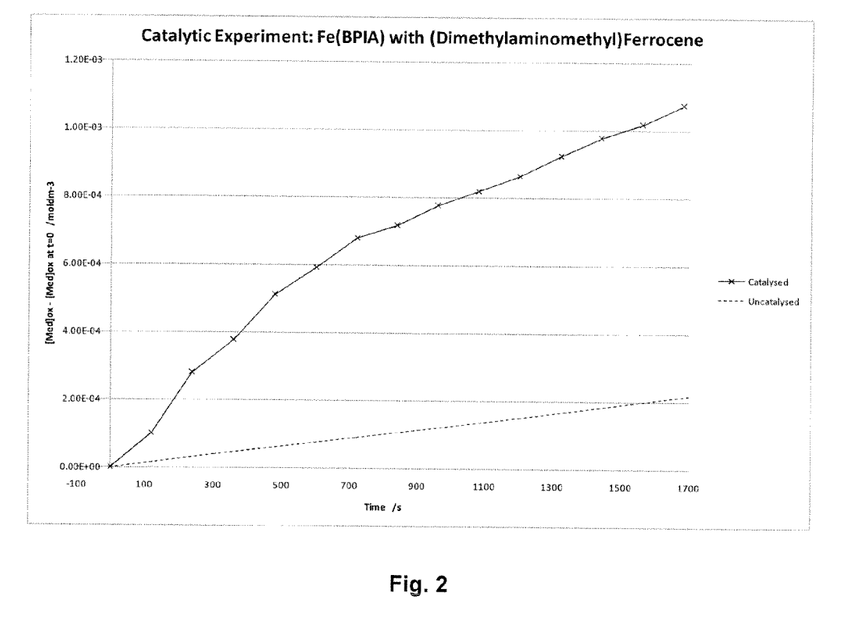
FIG. 2 shows a comparison of the uncatalysed and catalysed rate of oxidation of (dimethylaminomethyl)ferrocene by oxygen.

A solution containing 15 mM (dimethylaminomethyl)ferrocene and 1.0 mM of an iron (II) complex of BPIA was formed under an atmosphere of nitrogen at 75° C. As oxygen was bubbled through the solution the increase in absorbance at 626 nm was monitored with time. The data is given in FIG. 2 with uncatalysed data for comparison, and shows that this N-donor complex does catalyse the oxidation of the (dimethylaminomethyl)ferrocene mediator.

The invention claimed is:

1. A redox fuel cell comprising:
   an anode region comprising an anode and a cathode region comprising a cathode, said regions being separated by an ion selective polymer electrolyte membrane;
   a fuel passage through which fuel is supplied to the anode region of the cell;
   an oxidant inlet that supplies an oxidant to the cathode region of the cell;
   an electrical circuit between the anode and the cathode; and
   a catholyte solution comprising at least one non-volatile catholyte component flowing in fluid communication with the cathode, the catholyte solution comprising a redox mediator which is at least partially reduced at the cathode in operation of the cell, and at least partially regenerated by, optionally indirect, reaction with the oxidant after such reduction at the cathode, the catholyte solution further comprising a complexed multidentate N-donor ligand as at least one of said redox mediator and as a redox catalyst catalysing the regeneration of the said mediator, the multi-dentate N-donor ligand comprises at least one heterocyclic substituent selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid heterocyclic groups,
   wherein the multidentate N-donor ligand comprises a non-polymeric molecule containing up to 8 nitrogen atoms capable of coordinating to a transition metal centre.

2. A redox fuel cell according to claim 1 wherein the ligand may coordinate through each or any of the nitrogen atoms.

3. A redox fuel cell according to claim 1 wherein the multidentate N-donor ligand comprises from three to six nitrogen atoms capable of coordinating to a transition metal centre.

4. A redox fuel cell according to claim 3 wherein the N-donor ligand comprises from four to six nitrogen atoms capable of coordinating to a transition metal centre.

5. A redox fuel cell according to claim 4 wherein the N-donor ligand comprises five or six nitrogen atoms capable of coordinating to a transition metal centre.

6. A redox fuel cell according to claim 1 wherein the heterocyclic substituent comprises one or more substituent functional groups thereon, at any position or positions on the ring.

7. A redox fuel cell according to claim 6 wherein the substituent group is selected from alkyl, aryl, alkenyl, alkynyl, amine, protonated amine, quaternary amine, sulfate, sulfonate, sulfonic acid, phosphate, phosphonate, phosphonic acid, carboxylate, carboxylic acid, halides and combinations of two or more thereof on the same or on different positions on the ring.

8. A redox fuel cell according to claim 7 wherein each substituent group is spaced from the heterocyclic substituent by one or more spacer elements.

9. A redox fuel cell according to claim 8 wherein the or each spacer element is selected from straight or branched chain alkyl, alkenyl, aryl, cycloalkyl, alkaryl, aralkyl, aralkenyl and combinations of two or more thereof.

10. A redox fuel cell according to claim 1 wherein the N-donor ligand comprises the structure:

wherein X, Y and Z are optionally substituted N-containing heterocycles, at least one of which is selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups;

wherein A, B and C are spacer elements independently selected from straight or branched chain alkyl, alkenyl, aryl, cycloalkyl, alkaryl, aralkyl or aralkenyl; and wherein a, b and c can independently be any integer from 0 to 5.

11. A redox fuel cell according to claim 10 wherein a, b and c are independently any integer from 1 to 3.

12. A redox fuel cell according to claim 10 wherein one or more of A, B and C are independently substituted with one or more substituent functional groups at any position or positions on the ring.

13. A redox fuel cell according to claim 12 wherein the or each substituent group is independently selected from alkyl, aryl, alkenyl, alkynyl, amine, protonated amine, quaternary amine, sulfate, sulfonate, sulfonate, sulfonic acid, sulfonic acid, phosphate, phosphonate, phosphonic acid, carboxylate, carboxylic acid and/or halides.

14. A redox fuel cell according to claim 10 wherein the N-donor ligand is selected from:

15. A redox fuel cell according to claim 1 wherein the N-donor ligand comprises the structure:

wherein $R^1$ to $R^5$ are independently any group or atom, with from two to five $R^1$ to $R^5$ comprising organic groups containing an N donor atom, with from one to five of those N donor atoms belonging to one or more optionally substituted heterocycles, at least one of which is selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups.

16. A redox fuel cell according to claim 15 wherein any one or more of $R^1$ to $R^5$ is substituted with one or more substituent functional groups at any position or positions on the ring.

17. A redox fuel cell according to claim 16 wherein the or each substituent groups is independently selected from straight or branched chain alkyl, aryl, alkenyl, alkynyl, amine, protonated amine, quaternary amine, sulfate, sulfonate, sulfonic acid, phosphate, phosphonate, phosphonic acid, carboxylate, carboxylic acid, and halides and combinations of two or more thereof.

18. A redox fuel cell according to claim 16 wherein each substituent group is spaced from the heterocycle by any number of suitable spacer elements.

19. A redox fuel cell according to claim 18 wherein the or each spacer element is independently selected from optionally substituted straight or branched chain, alkyl, alkenyl, aryl, cycloalkyl, alkaryl, aralkyl, aralkenyl or combinations of two or more thereof.

20. A redox fuel cell according to claim 15 wherein the N-donor ligand is selected from:

21. A redox fuel cell according to claim 1 wherein the N-donor ligand has the structure:

wherein n is any integer from 1 to 10; and
wherein one to four of $R^1$ to $R^4$ are organic groups containing an N donor atom, with at least one, and up to four of those N-donor atoms belonging to an optionally substituted heterocycle, at least one of which is selected from pyrrole, imidazole, 1,2,3-triazole, 1,2,4-triazole, pyrazole, pyridazine, pyrimidine, pyrazine, indole, tetrazole, quinoline, isoquinoline and from alkyl, alkenyl, aryl, cycloalkyl, alkaryl, alkenaryl, aralkyl, aralkenyl groups substituted with one or more of the aforesaid cyclic groups;
and wherein $R^1$-$R^4$ can be the same or different.

22. A redox fuel cell according to claim 21 wherein the heterocycle contains any number of substituent functional groups at any position or positions on the ring.

23. A redox fuel cell according to claim 22 wherein the or each substituent group is independently selected from straight or branched chain alkyl, aryl, alkenyl, alkynyl, amine, protonated amine, quaternary amine, sulfate, sulfonate, sulfonic acid, phosphate, phosphonate, phosphonic acid, carboxylate, carboxylic acid, halides and combinations of one or more thereof.

24. A redox fuel cell according to claim 23 wherein each substituent group is spaced from the heterocycle by any number of suitable spacer elements.

25. A redox fuel cell according to claim 24 wherein the or each spacer element is independently selected from optionally substituted straight or branched chain alkyl, alkenyl, aryl, cycloalkyl, alkaryl, aralkyl or aralkenyl.

26. A redox fuel cell according to claim 21 wherein the N-donor ligand is selected from:

27. A redox fuel cell according to claim 1 wherein the catholyte solution comprises the complexed multidentate N-donor ligand as said redox mediator, and as said redox catalyst.

28. A redox fuel cell according to claim 1 wherein the catholyte solution comprises a redox mediator and the complexed multidentate N-donor ligand as redox catalyst.

29. A redox fuel cell according to claim 1 wherein the catholyte solution comprises the complexed multidentate N-donor ligand as redox mediator and a further material as redox catalyst.

30. A redox fuel cell according to claim 1 wherein in operation thereof the oxidant is reduced in the catholyte solution by the redox catalyst.

31. A redox fuel cell according to claim 30 wherein the resulting oxidised redox catalyst is effective at least partially to oxidise the mediator to regenerate the mediator after its reduction at the cathode.

32. A redox fuel cell according to any one of claim 1 wherein the catholyte solution is an aqueous solution.

33. A redox fuel cell according to claim 1 wherein the complexed multidentate N-donor ligand comprises a transition metal complex of the multidentate N-donor ligand.

34. A redox fuel cell according to claim 33 wherein the multidentate N-donor ligand comprises one or more N-donor atoms which do not coordinate with the transition metal.

35. A redox fuel cell according to claim 1 wherein the ion selective polymer electrolyte membrane is a cation selective membrane which is selective in favour of protons versus other cations.

36. A redox fuel cell according to claim 35 wherein the catholyte is acidic.

37. A redox fuel cell according to claim 1 wherein the ion selective polymer electrolyte membrane is an anion selective membrane.

38. A redox fuel cell according to claim 37 wherein the catholyte is alkaline.

39. A redox fuel cell according to claim 1 wherein the ion selective polymer electrolyte membrane is a bimembrane.

40. A fuel cell according to claim 1 wherein the redox mediator comprises a modified ferrocene species.

41. The redox fuel cell according to claim 15, wherein from three to five of the $R^1$ to $R^5$ groups comprise organic groups containing an N donor atom, and three to five of those N donor atoms belong to one or more of said optionally substituted heterocycles.

42. The redox fuel cell according to claim 21, wherein n is any integer from 1 to 5.

43. The redox fuel cell according to claim 21, wherein n is any integer from 1 to 3.

44. The redox fuel cell according to claim 21, wherein n is any integer from 1 to 3.

45. The redox fuel cell according to claim 21, wherein two to four of $R^1$ to $R^4$ are organic groups containing an N donor atom from three to four of those N-donor atoms belonging to said optionally substituted heterocycle.

* * * * *

UNITED STATES PATENT AND TRADEMARK OFFICE
CERTIFICATE OF CORRECTION

| | |
|---|---|
| PATENT NO. | : 8,951,695 B2 |
| APPLICATION NO. | : 12/864359 |
| DATED | : February 10, 2015 |
| INVENTOR(S) | : Kathryn Knuckey |

It is certified that error appears in the above-identified patent and that said Letters Patent is hereby corrected as shown below:

Title Page

In column 2 (page 1, item 56) at line 12, Under Other Publications, change "-arsonic" to -- -arsenic--.

In column 2 (page 2, item 56) at line 51, Under Other Publications, change "Scient" to --Science--.

In column 2 (page 2, item 56) at line 52, Under Other Publications, change "2005pp." to --2005 pp.--.

Specification

In column 3 at line 7 (approx.), Change "1-phentlethylhydroperoxide." to --1-phenylethylhydroperoxide.--.

In column 4 at line 62, Change "sulfonate, sulfonate," to --sulfonate,--.

In column 4 at lines 62-63, Change "sulfonic acid, sulfonic acid," to --sulfonic acid,--.

In column 5 at line 13 (approx.), Change "pyridine" to --pyridine.--.

In column 6 at line 40, Change "sulfonate, sulfonate," to --sulfonate,--.

In column 6 at lines 40-41, Change "sulfonic acid, sulfonic acid," to --sulfonic acid,--.

In column 7 at line 26, Change "sulfonate, sulfonate," to --sulfonate,--.

In column 7 at line 27, Change "sulfonic acid, sulfonic acid," to --sulfonic acid,--.

In column 7 at line 37 (approx.), Delete "$R^1$ to $R^4$ may be the same or different." and insert the same on Col. 7 Line 38 as a new paragraph.

In column 9 at line 24 (approx.), Change "an/or" to --and/or--.

In column 12 at line 65, Change "5×" to --5 X--.

In column 13 at line 43, Change "poly(2,6 diphenyl" to --poly(2,6-diphenyl--.

In column 13 at line 48, Change "suphonic" to --sulphonic--.

Signed and Sealed this
First Day of December, 2015

Michelle K. Lee
*Director of the United States Patent and Trademark Office*

CERTIFICATE OF CORRECTION (continued)
U.S. Pat. No. 8,951,695 B2

In column 17 at line 30 (approx.), Change "methyl)((2-" to --methyl(((2- --.

In column 17 at line 45 (approx.), Change "[BIPA]" to --[BPIA]--.

Claims

In column 19 at line 33 (approx.), In Claim 13, change "sulfonate, sulfonate," to --sulfonate,--.

In column 19 at lines 33-34 (approx.), In Claim 13, change "sulfonic acid, sulfonic acid," to --sulfonic acid,--.

In column 24 at line 1, In Claim 32, change "any one of claim" to --claim--.

In column 24 at line 23, In Claim 40, change "A fuel" to --A redox fuel--.